Jan. 30, 1951

J. RIXON 2,539,524

COACTING BELT CONVEYER

Filed Aug. 4, 1945

INVENTOR
JOHN RIXON
BY
Moses, Nolte, Crews & Berry
ATTORNEYS

Jan. 30, 1951 J. RIXON 2,539,524
COACTING BELT CONVEYER
Filed Aug. 4, 1945 2 Sheets-Sheet 2
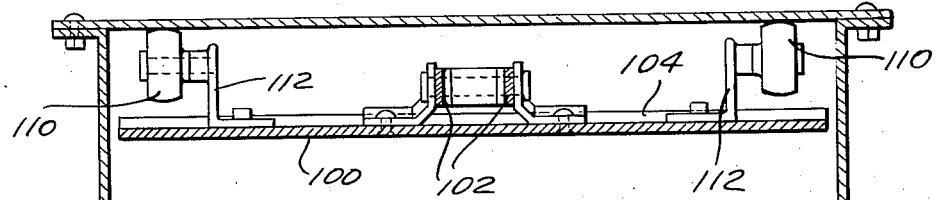
Fig. 5.
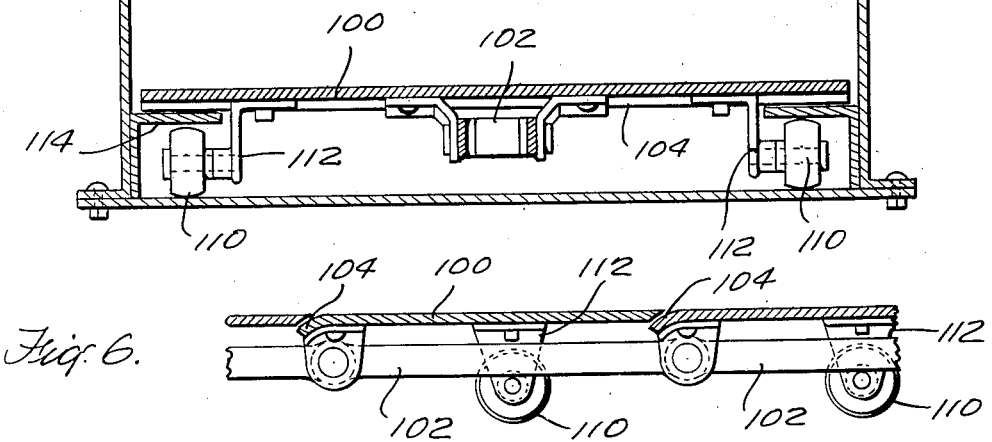
Fig. 6.
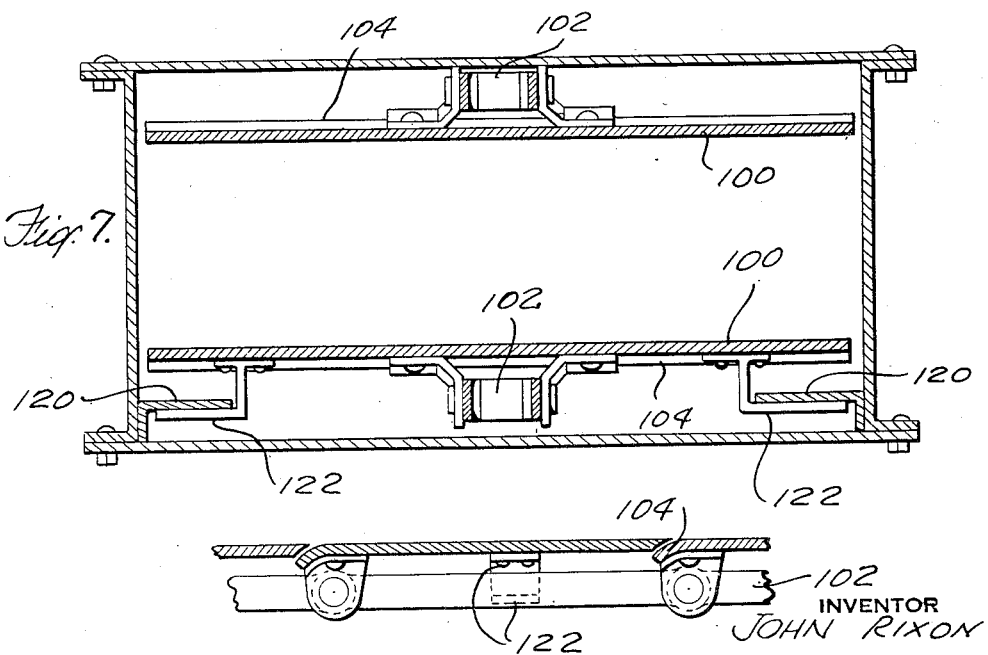
Fig. 7.
Fig. 8.
INVENTOR
JOHN RIXON
BY
Moses, Nolte, Crews + Berry
ATTORNEYS Patented Jan. 30, 1951

2,539,524

UNITED STATES PATENT OFFICE 2,539,524

COACTING BELT CONVEYER

John Rixon, New York, N. Y.; Henry Rixon, administrator of said John Rixon, deceased, assignor of one-half to Edmund Quincy Moses, New York, N. Y.

Application August 4, 1945, Serial No. 608,939

7 Claims. (Cl. 198—165)

This invention relates to conveyors, and particularly to mass flow conveyors which are designed for conveying or for conveying and elevating bulk material which moves through the conveyor in a steady stream. The material being elevated is supported in part at least by the material in the lower part of the conveyor, so that the conveying action depends upon the continuous flow of the entire mass being conveyed.

In accordance with the present invention the material is conveyed through a casing or trunk by means of belts or aprons which travel along the walls of the casing and which move the mass of material between them. The active runs or sheets of the belts which engage the material are spaced apart a definite distance and the material passes along between them without friction against the walls of the casing over which the belts run, and without being packed or compressed between the belts any more than results from the weight of the material in the column being conveyed.

It is an important object of the present invention to provide means for guiding the belts so that the runs thereof which engage the material travel in definitely spaced relationship throughout the conveying zone so as to avoid compression and possible packing of the material being conveyed.

It is also an object of the invention to provide means for guiding the belts which will enable the use of casings having curved sections. Where the casing is curved it will be seen that one of the belts has to travel along the concavely curved wall of the casing and in accordance with the present invention this result is accomplished.

In the accompanying drawings which show certain preferred embodiments of the invention, Figure 1 is a diagrammatic vertical sectional view of a typical installation showing a conveyor having a horizontal leg connected with a vertical or elevator leg by a curved portion;

Figure 5 is a transverse section showing another modified construction of the conveyor having sectional metal belts;

Figure 6 is a longitudinal section of part of the belt shown in Fig. 5;

Figure 7 is a transverse sectional view similar to Fig. 5 of another modified form of conveyor;

Figure 8 is a fragmentary side elevation of a portion of the belt shown in Fig. 7.

Figure 1:
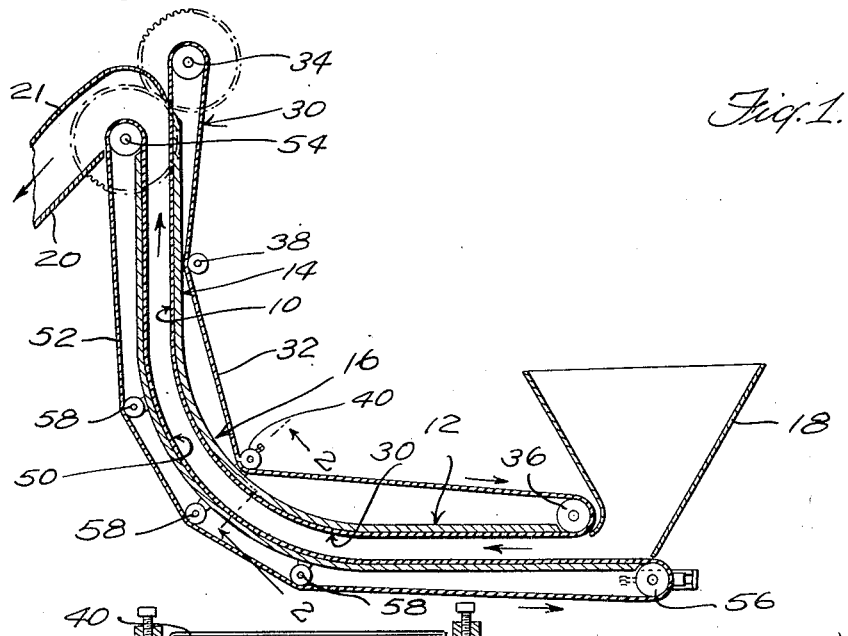
Figure 2:
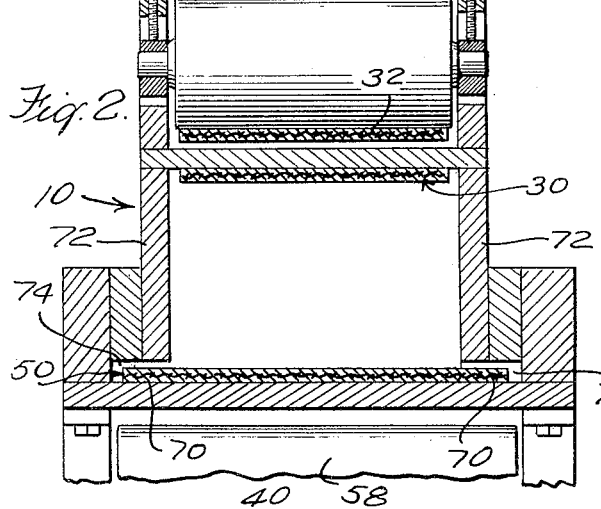
Figure 2 is a horizontal section on the line 2—2 of Figure 1.

Referring to the drawings in detail, and particularly to the example shown in Figs. 1 and 2, the conveyor comprises the four-sided casing 10 which comprises a more or less horizontal leg 12, a vertical or steeply inclined portion 14, and a connecting curved portion 16. The material is fed into the horizontal leg of the conveyor by any suitable means, such as the hopper 18, and is discharged at the upper end of the vertical or inclined leg by means of a chute 20 of any suitable form.

Mounted to travel along the inside of the upper or front wall of the casing is the lower run 30 of an endless belt or apron, the outer run of which is indicated at 32. The belt is guided over end rollers 34 and 36 and the outer run of the belt runs under suitable guide rollers such as 38 and 40. Any suitable number of guide rollers may be utilized and at least one of the rollers over which the belt runs is mounted for adjustment so as to take up for slack in the belt. As shown the roller 40 is adjustably supported so as to constitute the take-up roller. One of the end rollers, preferably the upper roller 34, is driven so as to drive the belt. The lower or inner run of the belt simply slides along the inside of the casing wall and requires no other guiding means.

At the bottom or back of the casing is a second endless belt comprising an active run 50 which follows the rear wall of the casing, and an outer run 52. This part runs over an upper pulley or roller 54 and a lower pulley or roller 56. As shown the roller 56 is adjustably mounted to provide for taking up slack. One of the rollers is driven, preferably the upper roller 54. The outer run of the belt may be guided along the curved outer surface of the casing, or may pass over guide rollers such as indicated at 58 in Fig. 1. It is important to guide the upper or inner run 50 of the lower belt or apron around all portions of the casing wall of a concave curvature, so as to maintain this sheet properly spaced from the active sheet 30 of the upper belt or apron. These runs should be kept uniformly spaced throughout the length of the casing so as to avoid squeezing or compacting the material at any point. In this way the material does not compact down or become solidified, the result of which would be very deleterious in the handling of materials which are likely to cake or mat down. A desirable method for guiding the active run of the lower belt around the curves is shown in Fig. 2. As here illustrated, the lower belt is made slightly wider than the upper belt and slightly wider than the maximum inside width of the casing. Thus the edges 70 of the belt overlie the side walls 72 of the casing and are thereby guided so as to cause the belt to follow the curvature of the casing. Preferably the casing is provided with lateral extensions 74 to receive and guide the edges 70 of the run 50 of the lower belt. The lower belt should be made out of material of sufficient stiffness so that it will substantially hold a flat shape transversely in the casing. A commercial rubber and fabric belt is ordinarily stiff enough transversely for this purpose, but if desired a laterally reinforced belt may be used.

The tension of the belts is preferably so adjusted that there is no substantial slack so that the belts run in definite paths.

A desirable arrangement of the belts in connection with the hopper 18 is shown in Fig. 1. As here illustrated it will be noted that the end roller 56 of the lower belt is located beyond the outer end wall of the hopper so that the belt forms the bottom of the hopper and supports the material fed into the hopper. The roller 36 of the upper belt is located above and to the left of the roller 56 and to the left of the rear wall of the hopper so that the material is supplied through the hopper between the two rollers.

At the discharge end of the conveyor the end roller 34 of the upper belt is located at a higher elevation than the end roller 54 of the lower belt, and the material is discharged over the end roller of the lower belt and falls down upon a suitable chute such as that indicated at 20. The top wall 21 of the chute preferably curves around to a point adjacent to the sheet 30 of the upper belt below the roller 34, so as to direct any material carried up by the belt into the chute.

It will be seen that the construction described is exceedingly simple and inexpensive. The moving parts of the conveyor consist simply of two flexible belts with no flights or attachments of any kind. The material being conveyed moves between two moving sheets and therefore rubs or drags only against the two side walls of the casing. This greatly reduces the friction as compared with mass flow conveyors in which the material is moved along by spaced flights and thereby produces frictional drag upon all four walls of the casing. Owing to the fact that the only moving parts of the conveyor are flexible belts, the conveyor may be driven at high speed, thereby giving greatly increased capacity for a given size of installation.

As the whole volume of material being conveyed moves between the two moving belt runs and there are no flights or carriers, it is possible to use the conveyor for conveying almost any kind of material. Dry powdered, granular or lumpy material can be conveyed, as well as moist material. Even comparatively wet plastic or semi-liquid materials can be conveyed.

Figure 3:
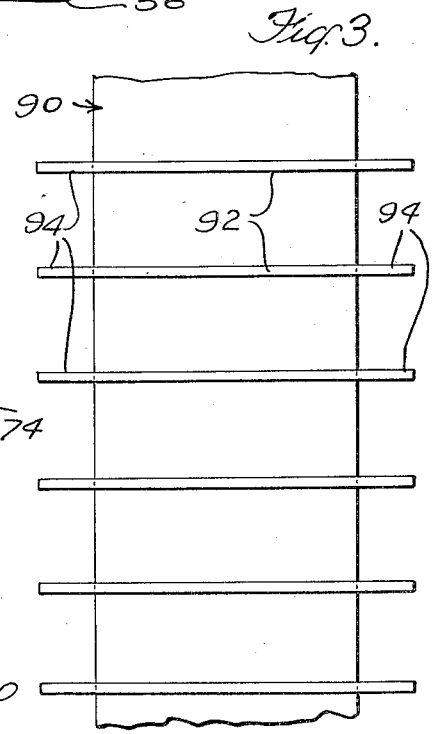
Figure 3 is a plan view of a modified form of belt.
Figure 4:
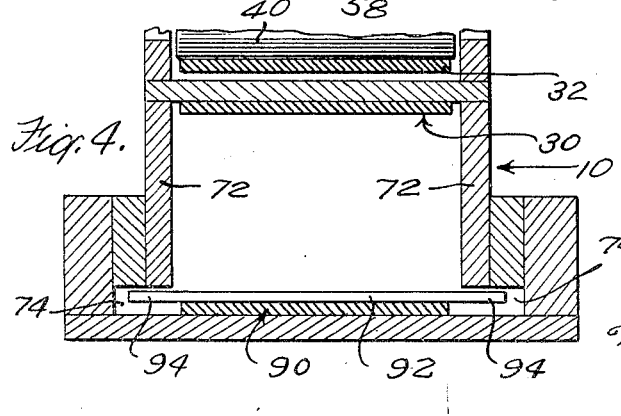
Figure 4 is a transverse section of a conveyor utilizing the belt of the form shown in Fig. 3.

Figures 3 and 4 show a modified form of lower belt in which instead of using a wide belt, the belt is provided with guide rods or members attached thereto which project laterally into guideways at the sides of the casing. These figures show the lower belt 90 provided at intervals with transverse guide rods 92 having ends 94 projecting laterally of the belt and guided in guideways 74 at the sides of the casing.

For conveying some kinds of material it may be desirable to use belts made of materials other than rubber or other flexible material. For instance in handling very hard or sharp materials it may be desirable to use belts made of metal. I have shown a suitable construction for these belts in Figures 5 and 6 in which the belts comprise a series of metal plates 100 attached to the links 102 of an endless chain. The plates 100 preferably have curved flanges 104 at one end which lie under the edges of the next adjacent plates, so that a substantially continuous conveying surface is provided which will travel around the curved parts of the casing. The upper conveyor is preferably provided with guide rollers 110 carried on brackets 112. These rollers roll along the inner wall of the casing. In order to cause the lower conveyor to follow the concave parts of the casing wall, the casing is preferably provided with guide rails 114 and the rollers 110 on the lower belt travel under these guide rails which thereby constrain the active run or sheet of the lower belt to follow a path adjacent to the curved wall of the casing.

Figures 7 and 8 show a modification utilizing plates but omitting the guide rollers, the chains simply sliding along the casing walls. In this case the lower part is constrained to travel close to the casing wall by means of guide rails 120 and glider shoes 122 on the under sides of the plates of the lower belt which engage such guide rails.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever forms its principles may be embodied.

What is claimed is:

1. A mass flow conveyor comprising a casing including parallel longitudinally curved front and rear wall portions and endless belts having continuous surfaces forming opposed runs lying adjacent to inner surfaces of the curved walls of the casing and holding the material to be conveyed out of contact with said surfaces, means for tensioning said belts under sufficient tension to maintain them in substantial tautness, means for guiding the opposed runs of the belts in paths spaced and maintained a substantially uniform distance apart through the conveying zone, and means for driving said belts.

2. A mass flow conveyor comprising a casing having a curved portion including convex and concave inner walls, endless belts having opposed runs lying adjacent to the inner surfaces of the curved walls of the casing, means independent of the material being conveyed for guiding said runs in curved parallel paths adjacent to said walls, and means for driving said belts.

3. A mass flow conveyor comprising a casing of substantially rectangular cross section having a bend therein and having longitudinal guide channels formed in the sides thereof adjacent to the outer wall of the casing around said bend, endless belts mounted with the opposing runs thereof travelling through the casing adjacent to the inner and outer curved walls of the casing around said bend, the belt having the run travelling adjacent to the outer wall of said bend being wider than the other belt, its edges being received in said guide channels, the inner run of the other belt travelling over and being guided by the wall of the casing at the inner side of said bend, and means for driving said belts.

4. A mass flow conveyor comprising a casing having a substantially horizontal leg, an upright leg, and a curved portion connecting said legs, an upper endless belt having a lower run travelling adjacent to and guided by the inner surface of the upper or front casing wall, a second endless belt the upper run of which travels adjacent to the inner surface of the lower or outer side of the casing, guides for the upper run of the lower belt constraining it to follow the concavity of the inner surface of the lower wall of the casing throughout the curved portion of the casing, and means for driving said belts.

5. A mass flow conveyor comprising a casing having a substantially horizontal leg, an upright leg, and a curved portion connecting said legs, an upper endless belt having a lower run travelling adjacent to and guided by the inner surface of the upper or front casing wall, a second endless belt the upper run of which travels adjacent to the inner surface of the lower or outer side of the casing, means for guiding the upper run of the lower belt so as to cause it to follow the concavity of the inner surface of the lower wall of the casing throughout the curved portion of the casing, guide rollers adjacent to the ends of the casing over which said belts pass, the guide roller over which the lower belt passes near the horizontal end of the casing being located further from the bend in the casing than the roller over which the corresponding end of the upper belt passes, the guide roller adjacent to the end of the upright leg of the casing over which the upper belt runs being located at a higher level than the corresponding guide roller over which the lower belt runs, the material conveyed being discharged over said last named roller, and means for driving said belts.

6. A mass flow conveyor comprising a casing of substantially rectangular cross section having a bend therein and having longitudinal guide channels formed in the sides thereof adjacent to the outer wall of the casing around said bend, endless belts mounted with the opposing runs thereof travelling through the casing adjacent to the inner and outer curved walls of the casing around said bend, the belt having a run travelling adjacent to the outer wall of said bend having cross members attached thereto, the ends of said cross members being received in said guide channels, the inner run of the other belt travelling over and being guided by the wall of the casing at the inner side of said bend, and means for driving said belts.

7. A mass flow conveyor comprising a casing having a bend therein and having longitudinal guide rails mounted inside of the casing adjacent to the outer wall of the casing around said bend, endless belts mounted with the opposing runs thereof travelling through the casing adjacent to the inner and outer curved walls of the casing around said bend, said belts comprising endless chains having metal plates attached thereto arranged to form substantially continuous conveying surfaces, and brackets carried by said plates of the belt having a run travelling adjacent to the outer wall of said bend, said brackets carrying means engaging and being guided by said guide rails so as to cause said plates to travel in a curved path adjacent to the outer curved wall of the casing around said bend.

JOHN RIXON.

REFERENCES CITED

The following references are of record in the file of this patent:

UNITED STATES PATENTS

| Number | Name | Date |
| --- | --- | --- |
| 1,294,675 | Kiner | Feb. 18, 1919 |
| 2,235,854 | Sayers | Mar. 25, 1941 |
| 2,254,116 | Cooper et al. | Aug. 26, 1941 |
| 2,257,351 | Silver | Sept. 30, 1941 |